Patented July 7, 1936

2,046,987

UNITED STATES PATENT OFFICE 2,046,987

LOW VISCOSITY HALOGEN CONTAINING RUBBER DERIVATIVE COMPOSITIONS

Herbert A. Winkelmann, Chicago, Ill., assignor to Marbo Products Corporation, Chicago, Ill., a corporation of Delaware No Drawing. Application June 10, 1935, Serial No. 25,807

6 Claims. (Cl. 134—17)

This invention relates to halogen containing butadiene derivative compositions adapted for use in casting, and in coating and impregnating wood, metal, fabric, paper and the like. More particularly, it relates to solutions of milled rubber hydrochloride.

Hydrochlorinated rubber is in general less soluble than chlorinated rubber. Highly chlorinated rubber containing 60% or more of chlorine may be obtained which is soluble in ordinary solvents, such as benzol, chloroform, carbon tetrachloride and ethylene dichloride to the extent of from 20–40%. On the other hand, solutions of hydrochlorinated rubber have hitherto not been obtained at room temperatures in over from ½% to 10% concentration, the amount depending on the type of rubber hydrochloride.

In the patent of Gebauer, Fuelnegg, and Moffett, No. 1,980,396, there are disclosed methods of making rubber hydrochloride by reacting rubber with gaseous or liquefied hydrogen chloride under various temperatures and pressures. Depending on whether the reaction is carried out with solid rubber or solutions of rubber at a low temperature such as —85° C., or at an elevated temperature such as room temperature, different types of rubber hydrochlorides are produced. The product obtained with solid rubber at —85° C. is soluble at room temperature to a concentration of over 10% in solvents such as benzol, ethylene dichloride, chloroform and carbon tetrachloride. The product obtained with rubber solutions at room temperature, like the other materials made by methods such as described in Bradley and McGavack Patent No. 1,519,659, are relatively resistant to solvents and oils, being soluble in benzol at room temperature to less than 2%, and when dissolved by heating, quickly jelling.

In this application the rubber hydrochloride which is soluble in benzol at room temperature in concentration of above 3%, for example around 7%, and which does not gel in said concentrations, is referred to as the soluble type rubber hydrochloride. It is believed to be an amorphous asymmetrical rubber hydrochloride. The rubber hydrochloride which is soluble to less than 3% in benzol, for example ½% soluble at room temperature, and which readily jellies, is designated as solvent resistant rubber hydrochloride. The test to determine whether one or the other hydrochloride is present is generally made in the laboratory by making films and contacting the film lying on a piece of paper with turpentine containing a dye. The soluble type rubber hydrochloride is readily penetrated by turpentine and stains the paper whereas the other rubber hydrochloride is not penetrated by turpentine.

It is an object of the present invention to increase the solubility and reduce the viscosity of solutions of halogen containing butadiene derivatives.

Another object is to produce concentrated solutions of rubber hydrochlorides of reduced viscosity.

A further object is to produce rubber hydrochloride solutions suitable for lacquer and cements.

Another object is to produce rubber hydrochloride cements and lacquer compositions which may be shipped without jelling.

Another object is to readily produce thick coatings of rubber hydrochloride having a high gloss.

Another object is the preparation of a coating solution which may be applied over labels containing printed matter.

It is a further object of this invention to produce rubber hydrochloride lacquer or cements containing a large amount of solids, and which is not too viscous for commercial use.

Other objects will become apparent on reading the specification.

In the present invention a halogen containing butadiene derivative, such as a rubber hydrohalide, is milled or kneaded, preferably with a small amount of stabilizer such as magnesium oxide, calcium oxide, magnesium carbonate or similar stabilizer such as disclosed in my copending application, Serial No. 11,665. Various fillers, plasticizers, hardeners, bonding agents, pigments, dyes and the like may be incorporated during the milling. The homogeneous milled mixture is then dissolved in a solvent such as benzol, carbon tetrachloride, ethylene dichloride and the like, and the resulting solution may be used for impregnating or coating various materials, or may be cast into films or sheets.

An advantage of this invention is that it makes possible the attaining of solutions of rubber hydrochloride of usable viscosity in high concentrations. By this invention solutions of solvent resistant rubber hydrochloride may be readily obtained in 3% concentration at room temperature instead of the usual less than 1% and, by heating, higher concentrations may be obtained having viscosities much less than hitherto obtained without milling. With the soluble rubber hydrochloride the improvement by this invention is more startling and perhaps of greater use. Heretofore solutions of 10% soluble rubber hydrochloride in benzol were about the maximum concentration that could be obtained at room temperature. By milling the rubber hydrochloride in accordance with the present invention for fifteen minutes, solutions as high as about 20% may be readily obtained, and by longer milling 50% to 60% solution may be obtained at room temperature. The advantage of this in the production of lacquers and other coating compositions is great, as it makes possible the production of thick coatings with smaller amounts of solutions than hitherto used, and makes possible the incorporation of a larger amount of fillers and pigments without difficulty in the solution.

The following table shows the results on milling various types of rubber hydrochloride. A is a partially saturated crystalline symmetrical rubber hydrochloride of approximately 29.6% chlorine content made according to Calvert Patent No. 1,989,632. B is nearly a completely reacted crystalline symmetrical rubber hydrochloride of approximately 31.5% chlorine content, made according to the Bradley and McGavack Patent No. 1,519,659. C is a completely reacted soluble type amorphous asymmetrical rubber hydrochloride of 29.5% chlorine content made with liquefied hydrogen chloride at about $-85°$ C. The rubber hydrochlorides were all mixed with about 2% magnesium oxide and 1% hexa and milled for approximately fifteen minutes. The letter M before the letter designating the type of rubber hydrochloride, indicates that the rubber hydrochloride has been milled.

Table

| Composition | Concentration in toluene | Solution temperature | Saybolt viscosity at 60° C. | Gelation time after removal from oven at 65° C. |
|---|---|---|---|---|
| | Percent | °C. | | |
| Toluene | | | 26.8″ | |
| A | 1 | 60 | 28.4″ | 3 days. |
| MA | 1 | 60 | 27.4″ | Do. |
| B | 1 | 60 | 31.2″ | Do. |
| MB | 1 | 60 | 27.4″ | Do. |
| C | 1 | 20 | 30.0″ | OK after 3 weeks. |
| MC | 1 | 20 | 28.2″ | Do. |
| MA | 3 | 60 | 30.0″ | 3 days. |
| MB | 3 | 60 | 30.2″ | Do. |
| MC | 3 | 20 | 31.4″ | OK after 2 weeks. |
| A | 6 | 60 | 1′ 28.8″ | |
| MA | 6 | 60 | 1′ 1.0″ | 20 hours. |
| B | 6 | 60 | 1′ 36.4″ | Do. |
| MB | 6 | 60 | 47.0″ | 6 hours. |
| C | 6 | 20 | 4′ 53.4″ | OK after 2 weeks. |
| MC | 6 | 20 | 42.6″ | Do. |
| MA | 12 | 75 | 3′ 22.2″ | 6 hours. |
| MB | 12 | 75 | 2′ 43.6″ | 2 hours. |
| MC | 12 | 20 | 2′ 31.6″ | OK after 2 weeks. |
| MA | 25 | 75 | 210′ | 3 days. |
| MB | 25 | 75 | 78′ 22″ | ½ hour. |
| MC | 25 | 20 | 106′ 44″ | 1 week. |

Viscosity determinations on unmilled 12%–25% rubber hydrochloride solutions were not obtained because of the difficulty, if not impossibility, of making such concentrated solutions even at elevated temperatures. Such high concentrations which are ordinarily used for nitrocellulose and such lacquers can practically not be obtained with rubber hydrochloride except by milling, preferably with a basic stabilizer. When, by means of elevated temperatures and long agitation such concentrations are obtained, the viscosity is so high that they are of little use. Although viscosity determinations on the unmilled 10% to 25% concentration were not obtained, it is evident from the viscosities on 6% concentrations that the decrease in viscosity due to milling is even more marked the higher the concentration.

The table, in addition to showing the effect of milling on viscosities, also shows the great value of the milled "soluble type" rubber hydrochloride (C) for coating. Such milled rubber hydrochlorides are nonjelling, or extremely slow jelling even in high concentrations, a factor of great importance in shipping and in making clear coatings or cast sheets.

The following example illustrates the invention as applied to the making of a coating composition.

Example 100 parts by weight of soluble type rubber hydrochloride made by reacting solid rubber and hydrogen chloride at $-85°$ C. is mixed in a milling machine with 3 parts of magnesium oxide, about 50 parts by weight of a fluid viscous glycerine-phthalic anhydride resin (rezyl), 2 parts paraffin, 2 parts hexa, and 100 parts pigment such as titanium oxide. The mixture is milled for about 15 minutes to a homogeneous integral mass, and then added to about 260 parts of toluene. The mixture is agitated. A solution results suitable for coating purposes and particularly useful for coating paper to produce washable paper shades.

Concentrated solutions of rubber hydrochloride of, for example, 10%–30% are also particularly suitable for coating labels containing printed matter. For coating over printed matter it is advisable to coat and dry as quickly as possible so as not to affect the printing. The coating should be sufficiently thick to give a good gloss, and in addition should be water proof. Low concentration of rubber hydrochloride, although applicable, soaks into the paper, and unless several coats are made with several drying operations, the coating does not have good body and gloss. Concentration of around 15% readily obtainable with milled rubber hydrochloride gives good results with only a single application.

Coatings of rubber hydrochloride are also particularly suitable for printing. Pictures and letters may be printed on rubber hydrochloride coatings with ordinary printing ink. Special inks are not necessary. Thick, glossy coatings obtainable with milled rubber hydrochloride supply a good printing surface.

An important factor in the production of rubber hydrochloride of increased solubility and reduced viscosity is the time of milling. The longer the time of milling the more readily concentrated solution may be obtained, and the less the viscosity for a given concentration. For example, by milling soluble type rubber hydrochloride for 15 minutes concentration of 30% rubber hydrochloride may be readily obtained; by milling for two hours 60% concentration may be obtained. The temperature of the milling may be varied but it is preferred to mill at low temperatures. The amount of stabilizer used should be as low as possible. For this reason magnesium oxide is the preferred stabilizer, as it will stabilize sufficiently when used as low as 2%, and may be used in smaller amounts. However, by using magnesium oxide above about 4% concentration, for example 8% concentration, solutions may be prepared without additional neutralization than that obtained by the magnesium oxide. Other basic stabilizers, although also operable as neutralizers, must be used in much larger amounts. After neutralization, the solids and incompatible materials are removed by filtration or centrifuging. The clear, neutralized solution is then ready for casting or coating.

Milling rubber hydrochloride without stabilizers in general results in considerable decomposition of the rubber hydrochloride, the production of hydrochloric acid which must be neutralized in the coating composition and the formation of decomposition products which are detrimental in films or coatings. It is, therefore, preferred to mill rubber hydrochloride with a stabilizer although it is within the bounds of this invention not so to do.

Various blending agents may be incorporated with the milled rubber hydrochlorides or, preferably, where possible, incorporated with the rubber hydrochloride during the milling, such as drying oils and semi-drying oils, including linseed oils, China-wood oils, tung oil. In general, any material entering into the manufacture of paints and varnishes may be incorporated with the rubber hydrochloride. Driers, thinners, fillers and pigments may be used. Resins and plasticizers, such as chlorinated paraffin, chlorinated diphenyls are particularly suitable. Rosin is also of advantage. In addition, materials not found in ordinary paints and varnishes but which are commonly used in the rubber art may be used with rubber hydrochloride to advantage. Among such materials are age resistors such as amyl amine, hexamethylene tetramine, and anti oxidants acting as age resistors and inhibitors against ordinary oxidation such as amino or hydroxy-compounds, secondary amines, condensation products of amines with carbonyl compounds, including para hydroxy diphenyl, diphenyl amine, o and p-ditoly amines, phenyl-beta-naphthyl amine, symmetrical diphenyl diamino ethane, condensation product of aniline with acetaldehyde, condensation product of alpha-naphthylamine with aldol. Where neutralization and removal of solids is contemplated the various blending agents and antioxidants incorporated by milling should be compatible liquids or solids soluble in the solvent used for the rubber hydrochloride. Otherwise such materials should be incorporated after centrifuging or filtration.

The use of amyl amine or hexamethylene tetramine which are stabilizers against decomposition during milling, and in addition are age resistors against changes taking place in sunlight is a part of this invention. Preferably amyl amine, hexamethylene tetramine and other age resistors should be used with magnesium oxide, which is much superior to the basic organic compounds as a stabilizer. However, the use of a combined stabilizer, age resistor, and neutralizer such as hexamethylene tetramine and amyl amine is of importance, even when used without magnesium oxide or similar basic inorganic or alkali earth compound type of stabilizer.

The milling of halogenated rubber, halogenated rubber hydrohalides, hydrohalogenated rubber halides, and in general all halogen containing derivatives of butadiene and the production of solutions therefrom of reduced viscosity is within the bounds of this invention. However, the halogenated butadiene derivatives are, in general, less stable than hydrohalogenated butadiene derivatives, and in general sufficiently soluble as made, and the milling of such compounds requires considerable magnesium oxide to retard decomposition and give neutral solutions so that, although the method of this invention is applicable to halogenated rubber, its greatest utility is with hydrohalogenated rubber.

By the term stabilizer is meant a substance of such character that it retards the decomposition of the halogen containing rubber derivative under the influence of heat and mechanical treatment. My copending application, Serial No. 11,665, relates broadly to the use of stabilizers. Among the stabilizers which have been found to be particularly suitable are magnesium oxide, magnesium carbonate, calcium oxide and litharge. The basic magnesium compounds are preferable, but many other stabilizers may be used as listed and described in my copending application, particularly the basic alkali earth compounds.

A great advantage of the present invention is that it makes possible the use of rubber hydrochlorides in commercial lacquers and varnishes, thereby giving to the art a new type of coating of superior flexibility and resistance to shock than other bases.

The present invention also makes possible the obtaining of thick coats of rubber hydrochloride with consequent high gloss, without the necessity of numerous applications. With the concentrations of rubber hydrochloride hitherto regularly obtainable the solutions are of such low body that numerous applications are necessary to obtain a glossy layer. The present concentration of above 12%, for example 15%–30% readily obtainable with milled rubber hydrochlorides, are of such body that even one application to a surface gives good results. Dyes and pigments incorporated in these concentrated solutions show up with superior brilliancy in the dried coatings.

This application is a continuation in part of my copending application, Serial No. 11,665, filed March 18, 1935.

I claim:

1. The method which comprises milling a halogen containing rubber derivative with a basic stabilizer and dispersing the milled mixture in a solvent for the halogen containing rubber derivative, said solvent being present in sufficient amount as to form a liquid composition.

2. The method which comprises milling rubber hydrohalide with a basic stabilizer and dispersing the milled mixture in a solvent for the rubber hydrohalide, said solvent being present in sufficient amount as to form a liquid composition.

3. The method which comprises milling a rubber hydrochloride with magnesium oxide and dispersing the milled mixture in a solvent for the rubber hydrochloride, said solvent being present in sufficient amount as to form a liquid composition.

4. The method which comprises milling a rubber hydrochloride with hexamethyltetralene and dispersing the milled mixture in a solvent for the rubber hydrohalide, said solvent being present in sufficient amount as to form a liquid composition.

5. The method which comprises adding a basic stabilizer to a rubber hydrohalide, milling the basic stabilizer with the rubber hydrohalide, and thereafter dispersing the milled mass in a solvent for the rubber hydrohalide, said solvent being present in sufficient amount to form a liquid composition.

6. The method which comprises adding magnesium oxide to a rubber hydrochloride, milling the magnesium oxide with the rubber hydrochloride, and thereafter dispersing the milled mass in a solvent for the rubber hydrochloride, said solvent being present in sufficient amount to form a liquid composition.

HERBERT A. WINKELMANN.

CERTIFICATE OF CORRECTION.

Patent No. 2,046,987.  July 7, 1936.

HERBERT A. WINKELMANN.

It is hereby certified that error appears in the printed specification of the above numbered patent requiring correction as follows: Page 3, second column, line 56, claim 4, for "hexamethyltetralene" read hexamethylenetetramine; and that the said Letters Patent should be read with this correction therein that the same may conform to the record of the case in the Patent Office.

Signed and sealed this 3rd day of November, A. D. 1936.

(Seal)

Henry Van Arsdale
Acting Commissioner of Patents.